(12) United States Patent
Jeong et al.

(10) Patent No.: US 12,439,059 B2
(45) Date of Patent: *Oct. 7, 2025

(54) APPARATUS FOR ENCODING AND DECODING IMAGE USING ADAPTIVE DCT COEFFICIENT SCANNING BASED ON PIXEL SIMILARITY AND METHOD THEREFOR

(71) Applicants: Electronics and Telecommunications Research Institute, Daejeon (KR); Kwangwoon University Research Institute for Industry Cooperation, Seoul (KR); Industry-Academia Cooperation Group of Sejong University, Seoul (KR)

(72) Inventors: Se-Yoon Jeong, Daejeon (KR); Hae-Chul Choi, Daejeon (KR); Jeong-Il Seo, Daejeon (KR); Seung-Kwon Beack, Seoul (KR); In-Seon Jang, Gunpo-si (KR); Jae-Gon Kim, Daejeon (KR); Kyung-Ae Moon, Daejeon (KR); Dae-Young Jang, Daejeon (KR); Jin-Woo Hong, Daejeon (KR); Jin-Woong Kim, Daejeon (KR); Yung-Lyul Lee, Seoul (KR); Dong-Gyu Sim, Seoul (KR); Seoung-Jun Oh, Seongnam-si (KR); Chang-Beom Ahn, Seoul (KR); Dae-Yeon Kim, Seoul (KR); Dong-Kyun Kim, Seoul (KR)

(73) Assignees: Electronics and Telecommunications Research Institute, Daejeon (KR); Kwangwoon University Research Institute for Industry Cooperation, Seoul (KR); Industry-Academia Cooperation Group of Sejong University, Seoul (KR)

( * ) Notice: Subject to any disclaimer, the term of this patent is extended or adjusted under 35 U.S.C. 154(b) by 311 days.

This patent is subject to a terminal disclaimer.

(21) Appl. No.: 17/219,985

(22) Filed: Apr. 1, 2021

(65) Prior Publication Data
US 2021/0218973 A1 Jul. 15, 2021

Related U.S. Application Data

(63) Continuation of application No. 16/438,785, filed on Jun. 12, 2019, now Pat. No. 11,330,274, which is a
(Continued)

(30) Foreign Application Priority Data

Aug. 17, 2006 (KR) .................. 10-2006-0077851
Jan. 26, 2007 (KR) .................. 10-2007-0008247

(51) Int. Cl.
*H04N 19/159* (2014.01)
*H04N 19/103* (2014.01)
(Continued)

(52) U.S. Cl.
CPC ......... *H04N 19/159* (2014.11); *H04N 19/103* (2014.11); *H04N 19/11* (2014.11);
(Continued)

(58) Field of Classification Search
None
See application file for complete search history.

(56) References Cited

U.S. PATENT DOCUMENTS 3,971,065 A 7/1976 Bayer
4,821,119 A 4/1989 Gharavi
(Continued)

FOREIGN PATENT DOCUMENTS

EP 0 230 632 A2 8/1987
EP 0 680 223 A1 11/1995
(Continued)

OTHER PUBLICATIONS

Kim, D. et al., "Adaptive Scanning Using Pixel Similarity for H.264/AVC," *Proceedings of the 2006 Korean Signal Processing Conference*, vol. 19, No. 1, pp. 1-4, Sep. 23, 2006, Hanyang University Ansan Campus, Ansan, Republic of Korea (in Korean, including English abstract).
(Continued)

*Primary Examiner* — Michael J Hess
(74) *Attorney, Agent, or Firm* — NSIP

(57) ABSTRACT

The present invention discloses an encoding apparatus using a Discrete Cosine Transform (DCT) scanning, which
(Continued)

includes a mode selection means for selecting an optimal mode for intra prediction; an intra prediction means for performing intra prediction onto video inputted based on the mode selected in the mode selection means; a DCT and quantization means for performing DCT and quantization onto residual coefficients of a block outputted from the intra prediction means; and an entropy encoding means for performing entropy encoding onto DCT coefficients acquired from the DCT and quantization by using a scanning mode decided based on pixel similarity of the residual coefficients.

8 Claims, 6 Drawing Sheets

Related U.S. Application Data continuation of application No. 15/784,623, filed on Oct. 16, 2017, now Pat. No. 10,499,064, which is a continuation of application No. 14/823,186, filed on Aug. 11, 2015, now Pat. No. 9,819,942, which is a continuation of application No. 13/975,251, filed on Aug. 23, 2013, now Pat. No. 9,225,982, which is a continuation of application No. 12/377,617, filed as application No. PCT/KR2007/001433 on Mar. 23, 2007, now Pat. No. 8,548,060.

(51) Int. Cl.
H04N 19/11 (2014.01)
H04N 19/129 (2014.01)
H04N 19/13 (2014.01)
H04N 19/136 (2014.01)
H04N 19/176 (2014.01)
H04N 19/18 (2014.01)
H04N 19/182 (2014.01)
H04N 19/61 (2014.01)
H04N 19/91 (2014.01)

(52) U.S. Cl.
CPC ........... *H04N 19/129* (2014.11); *H04N 19/13* (2014.11); *H04N 19/136* (2014.11); *H04N 19/176* (2014.11); *H04N 19/18* (2014.11); *H04N 19/182* (2014.11); *H04N 19/61* (2014.11); *H04N 19/91* (2014.11)

(56) References Cited

U.S. PATENT DOCUMENTS

| | | | |
|---|---|---|---|
| 5,285,402 A | 2/1994 | Keith | |
| 5,815,206 A | 9/1998 | Malladi et al. | |
| 6,188,381 B1 | 2/2001 | Van der Wal et al. | |
| 6,425,054 B1 | 7/2002 | Nguyen | |
| 6,426,975 B1 | 7/2002 | Nishi et al. | |
| 6,809,765 B1 | 10/2004 | Tao | |
| 6,856,701 B2 | 2/2005 | Karczewicz et al. | |
| 7,010,044 B2 | 3/2006 | Dattani et al. | |
| 7,298,782 B2 | 11/2007 | Kuriakin et al. | |
| 7,817,718 B2 | 10/2010 | Wang et al. | |
| 7,859,574 B1* | 12/2010 | Alvarez | H04N 19/132 348/222.1 |
| 7,903,735 B2 | 3/2011 | Cha et al. | |
| 7,933,334 B2 | 4/2011 | Kanehara | |
| 7,995,654 B2 | 8/2011 | Boon et al. | |
| 8,107,532 B2 | 1/2012 | Gaedke | |
| 8,135,064 B2 | 3/2012 | Tasaka et al. | |
| 8,199,819 B2 | 6/2012 | Seo et al. | |
| 8,548,060 B2 | 10/2013 | Jeong et al. | |
| 9,736,484 B2 | 8/2017 | Jeong et al. | |
| 2003/0007698 A1 | 1/2003 | Govindaswamy et al. | |
| 2003/0081850 A1 | 5/2003 | Karczewicz et al. | |
| 2005/0063462 A1* | 3/2005 | Lee | H04N 19/129 375/240.03 |
| 2005/0074062 A1 | 4/2005 | Sung et al. | |
| 2005/0078754 A1* | 4/2005 | Liang | H04N 19/93 375/E7.199 |
| 2005/0111542 A1* | 5/2005 | Hattori | H04N 19/527 375/E7.176 |
| 2005/0111545 A1* | 5/2005 | Prabhakar | H04N 19/152 375/E7.176 |
| 2005/0117789 A1* | 6/2005 | Kim | H04N 19/20 375/E7.076 |
| 2005/0265447 A1 | 12/2005 | Park | |
| 2005/0281337 A1 | 12/2005 | Kobayashi et al. | |
| 2006/0002466 A1 | 1/2006 | Park | |
| 2006/0044165 A1* | 3/2006 | Takakura | H03M 7/40 341/63 |
| 2006/0050786 A1* | 3/2006 | Tanizawa | H04N 19/176 375/E7.181 |
| 2006/0165170 A1* | 7/2006 | Kim | H04N 19/176 375/E7.176 |
| 2006/0165171 A1* | 7/2006 | Cha | H04N 19/147 375/E7.17 |
| 2007/0009047 A1 | 1/2007 | Shim et al. | |
| 2007/0189392 A1* | 8/2007 | Tourapis | H04N 19/174 375/E7.199 |
| 2007/0274385 A1 | 11/2007 | He | |
| 2010/0086025 A1 | 4/2010 | Chen et al. | |
| 2013/0343452 A1 | 12/2013 | Jeong et al. | |
| 2014/0037000 A1 | 2/2014 | Jeong et al. | |

FOREIGN PATENT DOCUMENTS

| | | |
|---|---|---|
| EP | 2 207 359 A2 | 7/2010 |
| EP | 2928184 A4 | 9/2016 |
| JP | 2003-6643 A | 1/2003 |
| JP | 2004-348741 A | 12/2004 |
| KR | 10-0135364 B1 | 5/1996 |
| KR | 10-1995-0005798 B1 | 5/1999 |
| KR | 10-0180173 B1 | 5/1999 |
| KR | 2002-0006149 A | 1/2002 |
| KR | 2002-0081342 A | 10/2002 |
| WO | WO 94/15312 A1 | 7/1994 |
| WO | WO 01/54416 A1 | 7/2001 |
| WO | WO 2008/020672 A1 | 2/2008 |
| WO | WO 2012/161444 A2 | 11/2012 |
| WO | WO 2017/084577 A1 | 5/2017 |

OTHER PUBLICATIONS

Koziri, M. et al., "Power Reduction in an H. 264 encoder through algorithmic and logic transformations"; Oct. 2006: ISLPED '06: Proceedings of the 2006 international symposium on Low power electronics and design; ACM; pp. 107-112.

International Search Report and Written Opinion of the International Searching Authority issued on Jun. 29, 2007, in counterpart International Application No. PCT/KR2007/001433. (4 pages in English).

Zrida, H et al., "High Level H.264/AVC Video Encoder Parallelization for Multiprocessor Implementation"; *Proceedings of the 2009 Design, Automation & Test in Europe Conference & Exhibition* (*Date '09*), pp. 940-945, conference held Apr. 20-24, 2009, Nice, France, ISBN 978-3-9810801-5-5.

Habli, Haitham, et al."Optimizing off-chip memory access costs in low power MPEG-4 decoder." Proceedings of the 3rd International Conference on Information and Communications Systems. ACM, Apr. 2012.

Bhagath, P Raj, et al., "Low complexity encoder for feedback-channel-free distributed video coding using deep convolutional neural networks at the decoder", *ACM*, Dec. 2016, pp. 1-7.

(56) References Cited

OTHER PUBLICATIONS

Lijuan Yang; Ying Li; Chune Zhang; "A optimization of intra-prediction mode selection algorithm based on H.264"; 2011 International Conference on Electronics, Communications and Control (ICECC); Year; 2011 | Conference Paper | Publisher: IEEE; pp. 1257-1260 (Year: 2011).
Lee, Yung-Lyul, et al., "Adaptive Scanning for H.264/AVC Intra Coding", ETRI Journal, vol. 28, No. 5, Oct. 2006 (4 pages in English).
Puri, Atul, et al., "Improvements in DCT-Based Video Coding," Proc. SPIE 3024, Visual Communications and Image Processing, 1997 (14 pages in English).
Richardson, Iain E. G., "H.264 and MPEG-4 Video Compression," Video Coding for Next-generation Multimedia, *The Robert Gordon University, UK*, 2003 (294 pages in English).
Fan, Xiaopeng et al., "A Novel Coefficient Scanning Scheme for Directional Spatial Prediction-Based Image Compression," IEEE, 2003 (4 pages in English).
Series H: Audiovisual and Multimedia Systems, Infrastructure of audiovisual services—Coding of moving video, Advanced video coding for generic audiovisual services, ITU-T Recommendation H.264, Mar. 2005, (343 pages in English).
Armstrong, M, et al., "High Frame-Rate Television," Research White Paper, *British Broadcasting Corporation*, Sep. 2008 (11 pages in English).
Oliver, Erik, et al., "What Will TV Cost You? Putting a Price on HEVC Licences," Analysing the leading HEVC patent pools, www.IAM-media.com, May/Jun. 2018 (11 pages in English).

\* cited by examiner

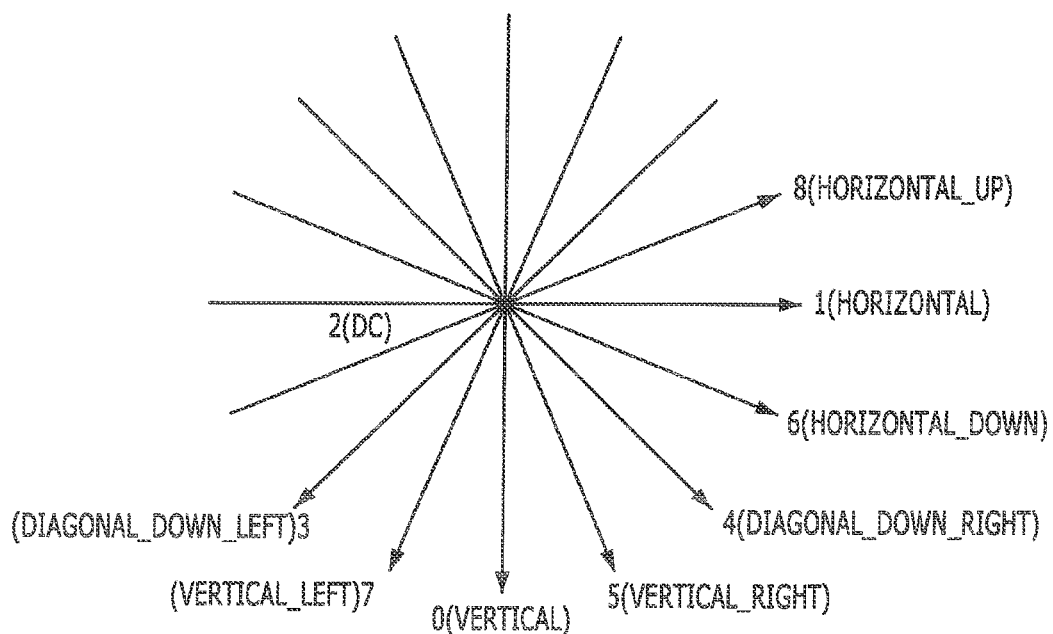

APPARATUS FOR ENCODING AND DECODING IMAGE USING ADAPTIVE DCT COEFFICIENT SCANNING BASED ON PIXEL SIMILARITY AND METHOD THEREFOR

CROSS-REFERENCE TO RELATED APPLICATIONS

This application is a continuation of application Ser. No. 16/438,785 filed on Jun. 12, 2019, now allowed, which is a continuation of application Ser. No. 15/784,623 filed on Oct. 16, 2017, now U.S. Pat. No. 10,499,064, which is a continuation of application Ser. No. 14/823,186 filed on Aug. 11, 2015, now U.S. Pat. No. 9,819,942, which is a continuation of application Ser. No. 13/975,251, filed on Aug. 23, 2013, now U.S. Pat. No. 9,225,982, which is a continuation of application Ser. No. 12/377,617 filed on Feb. 16, 2009, now U.S. Pat. No. 8,548,060, which is a U.S. National Stage application of International Application No. PCT/KR2007/001433 filed on Mar. 23, 2007, which claims the benefit of Korean Application Nos. 10-2006-0077851 filed on Aug. 17, 2006, and 10-2007-0008247 filed on Jan. 26, 2007, the entire disclosures of which are incorporated herein by reference for all purposes.

TECHNICAL FIELD

The present invention relates to an encoding/decoding apparatus and method using an adaptive Discrete Cosine Transform (DCT) coefficient scanning based on pixel similarity. More particularly, the present invention relates to an encoding/decoding apparatus and method which performs intra prediction onto input video, predicts pixel similarity based on pixel similarity information of coefficients to be encoded that is acquired from adjacent pixels in the intra-predicted video, and performs a most effective scanning, e.g., Discrete Cosine Transform (DCT) coefficient scanning, according to the predicted pixel similarity.

BACKGROUND ART

According to video compression standards for encoding/decoding video data, a frame is divided into a plurality of macro blocks and a macro block may be divided into a plurality of sub-blocks. The encoding/decoding is performed on the basis of a macro block unit or a sub-block unit based on temporal prediction and spatial prediction.

Herein, the temporal prediction is to predict motion of macro blocks or sub-blocks of a current frame by referring to blocks of adjacent frames.

The spatial prediction is to predict motion of macro blocks or sub-blocks of a current frame to be encoded by using boundary pixels of already recovered adjacent blocks.

The spatial prediction is also called intra prediction. The intra prediction takes advantage of a characteristic that when a pixel is predicted, pixels adjacent to it are highly likely to have similar values.

H.264/Advanced Video Coding (AVC) standard technology can compress video about twice as high as Moving Picture Experts Group 2 (MPEG-2) and about one and a half times as high as MPEG-4 by using such technique as intra prediction encoding, ¼-pixel based variable block motion prediction and compensation, Context-based Adaptive Variable Length Coding (CAVLC), and Context-based Adaptive Binary Arithmetic Coding (CABAC).

The H.264/AVC standard predicts pixel values of a current block by using prediction modes of 9 directivities.

FIG. 1 illustrates 9 prediction modes used for intra prediction of 4×4 blocks.

As illustrated in FIG. 1, the 9 prediction modes used for intra prediction of 4×4 blocks include a vertical mode (mode 0), a horizontal mode (mode 1), a direct current (DC) mode (mode 2), a diagonal_down_left mode (mode 3), a diagonal_down_right mode (mode 4), a vertical_right mode (mode 5), a horizontal_down mode (mode 6), a vertical_left mode (mode 7), and a horizontal_up mode (mode 8).

Herein, in the DC mode (mode 2), intra prediction is performed using a mean value of adjacent pixels. The arrows indicate prediction directions.

Meanwhile, intra 16×16 prediction encoding includes a total of four modes, which are a vertical mode, a horizontal mode, a DC mode, and a plane mode.

Also, intra 8×8 prediction encoding includes a total of 9 modes, just like the intra 4×4 prediction encoding. As for color difference signals, intra 8×8 prediction encoding is performed, and the intra 8×8 prediction encoding includes a DC mode, a vertical mode, a horizontal mode, and a plane mode and so on.

Hereinafter, prediction methods in the vertical and horizontal modes for intra prediction of 4×4 blocks will be described with reference to FIGS. 2 and 3.

FIG. 2 exemplarily illustrates a pixel prediction method in a vertical direction in a 4×4 block 200.

As shown in FIG. 2, pixel a 201, pixel e 202, pixel i 203, and pixel m 204 are predicted based on an adjacent pixel A in the vertical direction.

Also, pixels b, f, j and b are predicted based on an adjacent pixel B in the vertical direction, and pixels c, g, k and o are predicted based on an adjacent pixel C in the vertical direction. Pixels d, h, l and p are predicted based on an adjacent pixel D in the vertical direction.

FIG. 3 exemplarily illustrates a pixel prediction method in a horizontal direction in a 4×4 block 200.

As illustrated in FIG. 3, pixel a 205, pixel b 206, pixel c 207, and pixel d 208 are predicted based on an adjacent pixel I in a horizontal direction.

Also, pixels e, f, g and h are predicted based on an adjacent pixel J in the horizontal direction, and pixels i, j, k and l are predicted based on an adjacent pixel K in the horizontal direction. Pixels m, n, o and p are predicted based on an adjacent pixel L in the horizontal direction.

An encoder performs Discrete Cosine Transform (DCT) and quantization onto residual signals (which are of a pixel area) acquired by calculating differences between the predicted pixels and the current pixels. Subsequently, the encoder performs zigzag scanning and entropy encoding onto the transformed coefficients obtained from DCT and quantization.

Herein, although the zigzag scanning takes advantage of an energy compaction characteristic of a transformed coefficient that energy converges into low frequency components and energy appears little in high frequency components, the energy compaction after intra prediction is not always effective.

In short, the zigzag scanning is a method of scanning a transformed coefficient from low frequency components to high frequency components. When distribution of transformed coefficients appears more in the low frequency components, the zigzag scanning is effective. However, when spatial prediction having directivity is used, the distribution of transformed coefficients is influenced by the direction of prediction. Therefore, it is ineffective to apply the zigzag scanning to the prediction of all directions.

DISCLOSURE

Technical Problem

An embodiment of the present invention, which is devised to overcome the above problems, is directed to providing an encoding/decoding apparatus and method which performs intra prediction onto input video, predicts pixel similarity based on pixel similarity information of coefficients to be encoded acquired from adjacent pixels in the intra-predicted video, and performs a most effective scanning, e.g., DCT coefficient scanning, according to the predicted pixel similarity.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an encoding apparatus using a Discrete Cosine Transform (DCT) scanning, which includes a mode selection means for selecting an optimal mode for intra prediction; an intra prediction means for performing intra prediction onto video inputted based on the mode selected in the mode selection means; a DCT and quantization means for performing DCT and quantization onto residual coefficients of a block outputted from the intra prediction means; and an entropy encoding means for performing entropy encoding onto DCT coefficients acquired from the DCT and quantization by using a scanning mode decided based on pixel similarity of the residual coefficients.

In accordance with another aspect of the present invention, there is provided a decoding apparatus using a DCT scanning, which includes an entropy decoding means for performing entropy decoding onto encoded video; a scanning decision means for deciding a scanning mode for the video decoded in the entropy decoding means; and a video recovery means for recovering the video based on the scanning mode decided in the scanning decision means.

In accordance with another aspect of the present invention, there is provided an encoding method using a DCT scanning, which includes the steps of selecting an optimal mode for intra prediction; performing intra prediction onto video inputted based on the mode selected in the mode selection step; performing DCT and quantization onto residual coefficients of a block outputted from the intra prediction step; deciding pixel similarity of the residual coefficients; and performing entropy encoding onto DCT coefficients acquired from the DCT and quantization by using a scanning mode decided in the pixel similarity decision step.

In accordance with an aspect of the present invention, there is provided a decoding method using a DCT scanning, which includes the steps of performing entropy decoding onto encoded video; deciding a scanning mode for the video decoded in the entropy decoding step; and recovering the video based on the scanning mode decided in the scanning decision step.

According to an embodiment of the present invention, a luminance block may go through an intra 4×4 luminance encoding mode of H.264/Advanced Video Coding (AVC), which includes a vertical mode, a horizontal mode, a diagonal_down_left mode, a diagonal_down_right mode, a vertical_right mode, a horizontal_down mode, a vertical_left mode, and a horizontal_up mode, and an intra 16×16 luminance encoding mode of H.264/AVC, which includes a vertical mode, a horizontal mode, a plane mode, and a DC mode.

Also, according to an embodiment of the present invention, a chrominance block may go through an intra M×N chrominance encoding mode of H.264/AVC, which includes a vertical mode, a horizontal mode, a plane mode and a DC mode.

Advantageous Effects

As described above, the present invention can improve a compression rate of intra encoding by applying a most effective scanning method according to pixel similarity in order to encode/decode video.

Also, the present invention can improve a video compression rate by being applied to a video compression technology using intra prediction, which will be developed in the future.

Also, the present invention can reduce a need for an additional module by applying the same similarity information to both encoder and decoder.

BRIEF DESCRIPTION OF THE DRAWINGS

FIG. 1 illustrates 9 prediction modes used for intra prediction of 4×4 blocks according to H.264/AVC.

FIG. 2 exemplarily illustrates a pixel prediction method in a vertical direction.

BEST MODE FOR THE INVENTION

The advantages, features and aspects of the invention will become apparent from the following description of the embodiments with reference to the accompanying drawings, which is set forth hereinafter. When it is considered that detailed description on a related art may obscure a point of the present invention, the description will not be provided herein. Hereinafter, specific embodiments of the present invention will be described in detail with reference to the accompanying drawings.

Figure 3:
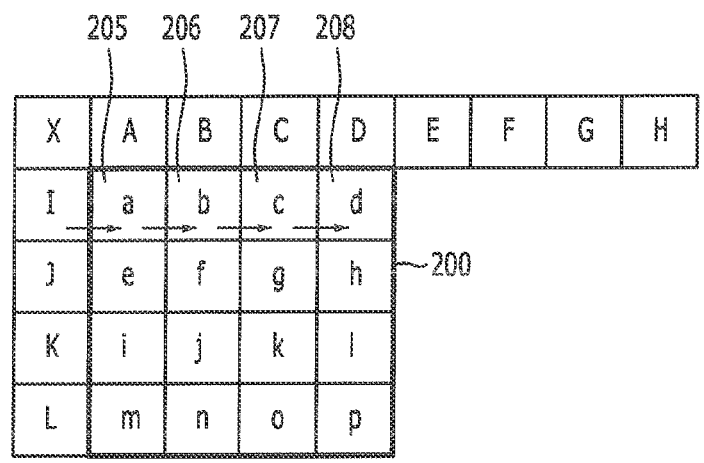
FIG. 3 exemplarily illustrates a pixel prediction method in a horizontal direction.
Figure 4:
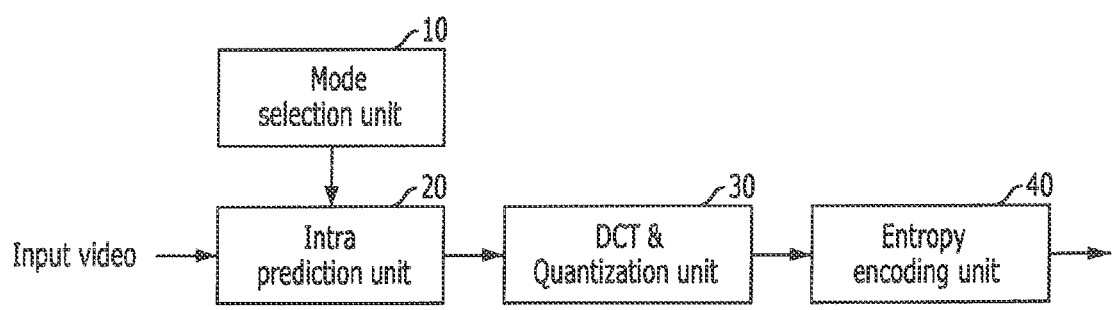
FIG. 4 is a block view showing an encoding apparatus using an adaptive DCT coefficient scanning based on pixel similarity in accordance with an embodiment of the present invention.

FIG. 4 is a block view showing an encoding apparatus using an adaptive DCT coefficient scanning based on pixel similarity in accordance with an embodiment of the present invention.

As illustrated in FIG. 4, the encoding apparatus based on DCT coefficient scanning adaptive to pixel similarity includes a mode selection unit 10, an intra prediction unit 20, a DCT and quantization unit 30, and an entropy encoding unit 40.

The mode selection unit 10 selects an optimal mode among several available prediction modes for intra prediction. In other words, it selects one among a plurality of possible encoding modes when 4×4, 16×16, or 8×8 intra prediction is performed. Generally, the mode selection unit 10 selects one mode according to a rate-distortion optimization method for reducing an amount of distortion at a given bit rate.

The intra prediction unit 20 receives a video, and performs 4×4 intra prediction for pixels of luminance blocks and 8×8 intra prediction for pixels of chrominance blocks based on a mode selected in the mode selection unit 10.

The DCT and quantization unit 30 performs DCT and quantization onto difference values outputted from the mode selection unit 10, that is, onto residual coefficient blocks indicating differences between pixel values of macro blocks of a current frame to be encoded and predicted pixel values, and transmits resulting coefficients to the entropy encoding unit 40.

The entropy encoding unit 40 arrays DCT coefficients obtained in the DCT and quantization unit 30 by using an adaptive DCT coefficient scanning based on pixel similarity, performs entropy encoding onto the arrayed DCT coefficients, and outputs an encoded video bitstream in accordance with the result.

Herein, the entropy encoding is an encoding technique for enhancing a compression rate by allocating a few bits to data highly likely to occur and many bits to data that are not likely to occur. Examples of the entropy encoding used in the present invention include Context-based Adaptive Variable Length Coding (CAVLC) or Context-based Adaptive Binary Arithmetic Coding (CABAC).

Figures 7, 8:
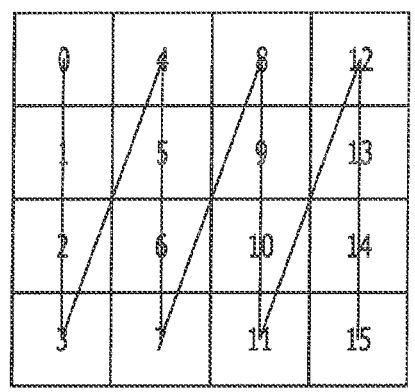
FIG. 7 exemplarily illustrates a vertical scanning method used in the present invention.
FIG. 8 illustrates a method for predicting pixel similarity in vertical and horizontal directions in accordance with an embodiment of the present invention.
Figure 9:
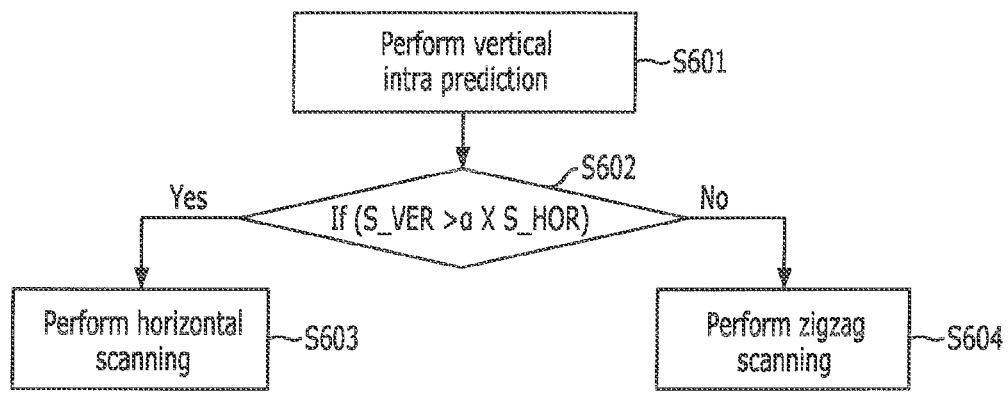
FIG. 9 is a flowchart describing an adaptive scanning method based on pixel similarity in a vertical intra prediction mode in accordance with an embodiment of the present invention.
Figure 10:
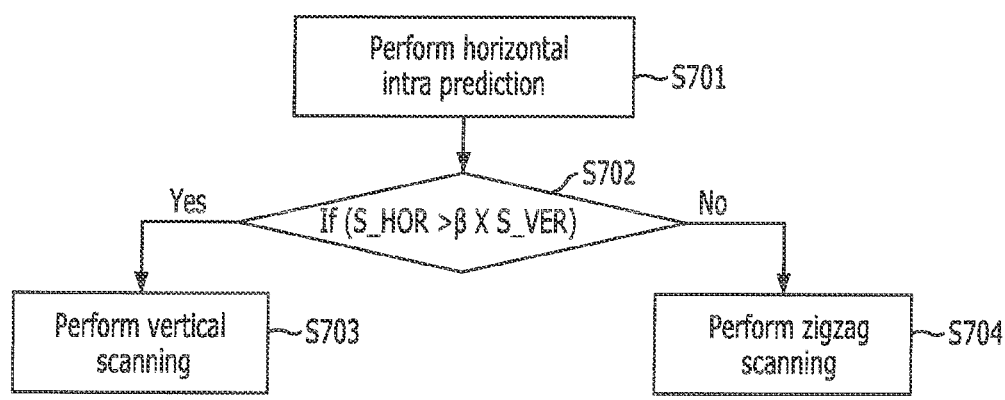
FIG. 10 is a flowchart describing an adaptive scanning method based on pixel similarity in a horizontal intra prediction mode in accordance with an embodiment of the present invention.

With reference to FIGS. 8 to 10, described hereafter are a method of predicting pixel similarity in vertical and horizontal directions in the entropy encoding unit 40, and a scanning method in vertical and horizontal intra prediction modes.

Figure 5:
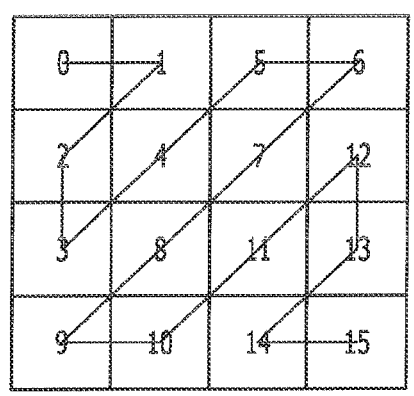
FIG. 5 exemplarily illustrates a zigzag scanning method used in the present invention.
Figure 6:
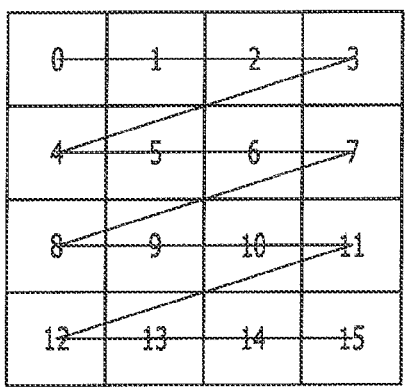
FIG. 6 exemplarily illustrates a horizontal scanning method used in the present invention.

FIG. 5 exemplarily illustrates a typical zigzag scanning method used in the present invention. FIG. 6 exemplarily illustrates a typical horizontal scanning method used in the present invention. FIG. 7 exemplarily illustrates a typical vertical scanning method used in the present invention.

As shown in FIG. 5, the zigzag scanning method used in the present invention is devised in consideration that low frequency components of transformed coefficients acquired from the DCT and quantization are highly likely to be positioned in the upper left part of a two-dimensional plane. It takes advantage of a transformed coefficient energy compaction characteristic that coefficients after DCT collectively appear in low frequencies, whereas coefficients after DCT less appear in high frequencies.

The zigzag scanning method may be more efficient when pixel similarity in the horizontal direction is similar to the pixel similarity in the vertical direction.

However, when intra prediction encoding, particularly, vertical or horizontal intra prediction, is performed, the similarity of the residual coefficients in the vertical direction shows much difference from the similarity in the horizontal direction. Thus, the above-described coefficient distribution is not always effective. Therefore, it is inefficient to apply the zigzag scanning to prediction of all directions.

To describe an example of the vertical prediction mode, the vertical prediction mode is selected as an optimal mode in a rate-distortion optimization process, when the pixel similarity in the vertical direction is high. Herein, significant coefficients are distributed in the first row. Therefore, the horizontal scanning shown in FIG. 6 is more efficient than the typical zigzag scanning.

Meanwhile, to describe an example of the horizontal prediction mode, the horizontal prediction mode is selected as an optimal mode, when the pixel similarity in the horizontal direction is high. Herein, significant coefficients are distributed in the first column. Therefore, the vertical scanning shown in FIG. 7 is more efficient.

However, since the pixel similarity before intra prediction is different from pixel similarity of residual coefficients after the intra prediction, it is inefficient to simply use the scanning method of FIG. 6 or FIG. 7 according to the intra prediction mode.

Therefore, if pixel similarities in the vertical and horizontal directions of a block to be encoded are predicted based on similarity information among adjacent block boundary pixels which are already recovered and an adaptive scanning method according to the prediction result is used, the encoding efficiency can be increased.

FIG. 8 illustrates a method for predicting pixel similarity in vertical and horizontal directions in accordance with an embodiment of the present invention.

As illustrated in FIG. 8, pixels A, B, C and D are positioned adjacent to the upper part of a current block to be encoded, whereas pixels E, F, G and H are positioned adjacent to the left part of the current block to be encoded.

Herein, when vertical prediction encoding is performed, the vertical-directional pixel similarity of the pixels a, e, i and m in the first column of the current block to be encoded is the same as the vertical-directional pixel similarity of residual coefficients a-A, e-A, i-A, and m-A after vertical prediction. This is because the residual coefficients a-A, e-A, i-A, and m-A are differentiated by the same prediction pixel A from the pixels a, e, i and m, and thus the correlation does not change.

Also, the vertical-directional pixel similarity of the pixels in columns 2, 3 and 4 of the current block to be encoded is the same as the vertical-directional pixel similarity of residual coefficients after vertical prediction.

However, the horizontal-directional pixel similarity of the pixels a, b, c and d in the first row of the current block to be encoded is different from the horizontal-directional pixel similarity of residual coefficients a-A, b-B, c-C, and d-D after vertical prediction. Also, the horizontal-directional pixel similarity before vertical prediction is higher than the horizontal-directional pixel similarity after the vertical prediction. Thus, it becomes similar to or higher than the vertical-directional pixel similarity.

Likewise, in the case of the horizontal prediction encoding, the horizontal-directional pixel similarity of the pixels a, b, c and d in the first row of the current block to be encoded is the same as the horizontal-directional pixel similarity of residual coefficients a-E, b-E, c-E, and d-E after horizontal prediction. Also, the horizontal-directional pixel similarity of the pixels in rows 2, 3 and 4 of the current block to be encoded is the same as the horizontal-directional pixel similarity of the residual coefficients after horizontal prediction.

However, the vertical-directional pixel similarity of the pixels a, e, i and m in the first column of the current block to be encoded is different from the vertical-directional pixel similarity of residual coefficients a-E, e-F, i-G, and m-H after horizontal prediction. Also, the vertical-directional pixel similarity before horizontal prediction is higher than the vertical-directional pixel similarity after the horizontal prediction. Thus, it becomes similar to or higher than the horizontal-directional pixel similarity.

As described above, when the pixel similarities in the vertical and horizontal directions are similar, a general zigzag scanning method is more efficient than the horizontal and vertical scanning methods.

Therefore, when the vertical intra prediction mode is performed and the vertical-directional pixel similarity of residual coefficients is high and their horizontal-directional pixel similarity is low, it is more efficient to use the horizontal scanning.

Meanwhile, when the horizontal intra prediction mode is performed and the horizontal-directional pixel similarity of residual coefficients is high and their vertical-directional pixel similarity is low, it is more efficient to use the vertical scanning.

When the vertical-directional pixel similarity of recovered 8 pixels A, B, C, D, E, F, G and H of FIG. 8 is referred to as S_VER and their horizontal-directional pixel similarity is referred to as S_HOR, the pixel similarities for increasing the efficiency of 4×4 prediction encoding can be calculated using the following Equation 1.

$$S\_VER = \frac{1}{Variance(E, F, G, H)}$$
$$S\_HOR = \frac{1}{Variance(A, B, C, D)}$$

Equation 1

In Equation 1, Variance ( ) denotes a dispersion; E, F, G and H denote pixels adjacent to the left part of the current block to be encoded; and A, B, C and D denote pixels adjacent to the upper part of the current block to be encoded.

When the vertical prediction mode is carried out, a value obtained by multiplying S_HOR by a multiplication factor $\alpha(\alpha \geq 1)$ is used as a horizontal-directional pixel similarity prediction value of residual coefficients of the current block. Herein, the $\alpha$ value is fixed at 2 in an experiment. The S_VER as it is used as a vertical-directional pixel similarity prediction value of the residual coefficients of the current block.

When the horizontal prediction mode is carried out, a value obtained by multiplying S_VER by a multiplication factor $\beta(\beta \geq 1)$ is used as a vertical-directional pixel similarity prediction value of the residual coefficients of the current block. Herein, the $\beta$ value is fixed at 2 in an experiment. The S_HOR as it is used as a horizontal-directional pixel similarity prediction value of the residual coefficients of the current block.

The vertical-directional and horizontal-directional pixel similarity prediction values acquired in the above methods are compared to each other to decide a scanning method.

Although a 4×4 intra prediction mode is described in the above example, the present invention is not limited to the 4×4 intra prediction mode, and the present invention can be applied to an M×N intra prediction mode, too.

Hereinafter, a method of selecting a scanning method in the vertical and horizontal intra prediction modes will be described in detail with reference to FIGS. 9 and 10.

FIG. 9 is a flowchart describing an adaptive scanning method based on pixel similarity in a vertical intra prediction mode in accordance with an embodiment of the present invention.

In case of a vertical intra prediction mode in step S601, an S_VER value and a value of α×S_HOR are compared in step S602. When the S_VER value is greater than the value of α×S_HOR, a horizontal scanning method is used in step S603. When the S_VER value is smaller than the value of α×S_HOR, a zigzag scanning method is used in step S604.

Herein, when a vertical-directional pixel similarity of the current block to be encoded based on similarity of adjacent pixels is predicted higher than the horizontal-directional pixel similarity thereof, transformed coefficients obtained after DCT and quantization are highly likely to be distributed in a direction horizontal to a first row of the block. Therefore, the horizontal scanning method can bring about a high encoding efficiency.

FIG. 10 is a flowchart describing an adaptive scanning method based on pixel similarity in a horizontal intra prediction mode in accordance with an embodiment of the present invention.

In case of a horizontal intra prediction mode in step S701, an S_HOR value and a value of β×S_VER are compared in step S702. When the S_HOR value is greater than the value of β×S_VER, a vertical scanning method is used in step S703. When the S_HOR value is smaller than the value of β×S_VER, a zigzag scanning method is used in step S704.

Herein, when a horizontal-directional pixel similarity of the current block to be encoded based on similarity of adjacent pixels is predicted higher than the vertical-directional pixel similarity thereof, transformed coefficients obtained after DCT and quantization are highly likely to be disposed in a direction vertical to a first row of the block. Therefore, the vertical scanning method can bring about a high encoding efficiency.

Figure 11:
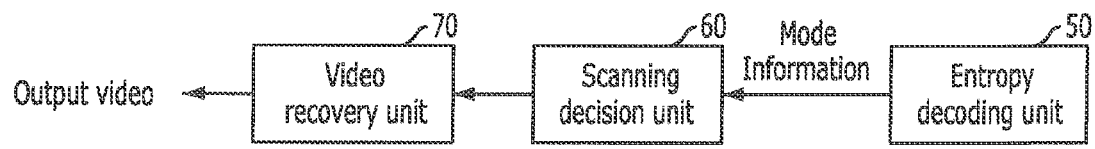
FIG. 11 is a block view showing a decoding apparatus using an adaptive DCT coefficient scanning based on pixel similarity in accordance with an embodiment of the present invention.

FIG. 11 is a block view showing a decoding apparatus using an adaptive DCT coefficient scanning based on pixel similarity in accordance with an embodiment of the present invention.

As shown in FIG. 11, the decoding apparatus using an adaptive DCT coefficient scanning based on pixel similarity includes an entropy decoding unit 50, a scanning decision unit 60, and a video recovery unit 70.

The entropy decoding unit 50 receives an encoded video bitstream encoded in the encoding apparatus of FIG. 4 using an adaptive DCT coefficient scanning based on pixel similarity and decodes it through an entropy decoding method such as CAVLC or CABAC. Then, the entropy decoding unit 50 transmits the entropy-decoded video bitstream to the scanning decision unit 60.

The scanning decision unit 60 decides a scanning method for the coefficients decoded in the entropy decoding unit 50 according to an intra prediction mode, as described in the above with reference to FIGS. 8 to 11.

The video recovery unit 70 finally recovers the coefficients by using the scanning method decided in the scanning decision unit 60 to recover the video.

An experiment was carried out for diverse test videos using Joint Model 86 (JM86), which is an H.264/AVC Reference Codec, according to the above-described methods. The result of an increase in compression efficiency was as follows. In the experiment, videos recommended by H.264/AVC as test videos were used. The following Table 1 shows conditions of the experiment.

TABLE 1

| Video | News (QCIF) | Container (QCIF) | Coast (QCIF) | Paris (QCIF) | Coast (CIF) |
|---|---|---|---|---|---|
| Entire Frame | 300 (30 Hz) | 300 (30 Hz) | 300 (30 Hz) | 300 (35 Hz) | 300 (30 Hz) |
| Conditions | CAVLC, Intra only, QP(18, 22, 26, 30), rate-distortion optimization | | | | |

As shown in Table 1, five test videos with different sizes were used for the experiment.

The following Table 2 presents video compression rates when the test videos were compressed using a conventional compression method, which is a zigzag scanning method of H.264/AVC, and the compression method of the present invention, which is the adaptive scanning method according to intra prediction mode under the same conditions as the Table 1.

TABLE 2

| Sequence | QP | H.264/AVC PSNR (dB) | H.264/AVC Bit rate (Kbps) | Method of the Present Invention PSNR (dB) | Method of the Present Invention Bit rate (Kbps) | Bit Saving rate (%) |
|---|---|---|---|---|---|---|
| News (QCIF) | 18 | 45.64 | 2370.65 | 45.64 | 2344.75 | 1.51% |
| | 22 | 43.06 | 1714.99 | 43.05 | 1692.69 | 1.67% |
| | 26 | 40.32 | 1221.96 | 40.32 | 1206.02 | 1.51% |
| | 30 | 37.50 | 872.65 | 37.49 | 860.23 | 1.49% |
| Container (QCIF) | 18 | 44.84 | 874.63 | 44.84 | 857.75 | 1.93% |
| | 22 | 41.71 | 643.42 | 41.7 | 630.5 | 2.01% |
| | 26 | 38.61 | 451.07 | 38.61 | 441.54 | 2.11% |
| | 30 | 35.77 | 317.36 | 35.76 | 309.93 | 2.34% |
| Coast (QCIF) | 18 | 44.18 | 2200.99 | 44.13 | 2152.15 | 2.22% |
| | 22 | 40.61 | 1631.56 | 40.59 | 1592.37 | 2.40% |
| | 26 | 37.13 | 1139.76 | 37.12 | 111.02 | 2.52% |
| | 30 | 34.00 | 765.52 | 33.99 | 746.77 | 2.45% |
| Paris (CIF) | 18 | 44.72 | 4360.41 | 44.71 | 4271.09 | 2.05% |
| | 22 | 41.57 | 3334.22 | 41.56 | 3259.84 | 2.23% |
| | 26 | 38.25 | 2450.69 | 38.24 | 2391.77 | 2.40% |
| | 30 | 35.04 | 1780.73 | 35.03 | 1736.21 | 2.50% |
| (Coast) (CIF) | 18 | 44.34 | 4068.4 | 44.33 | 4015.7 | 1.30% |
| | 22 | 40.8 | 2989.5 | 40.8 | 2950.65 | 1.30% |
| | 26 | 37.32 | 2074.47 | 37.32 | 2045.89 | 1.38% |
| | 30 | 34.21 | 1388.07 | 34.22 | 1369.23 | 1.36% |

The Table 2 shows that the result of video compression using the adaptive scanning method according to the intra prediction mode, which is suggested in the present invention, is superior to that of video compression using only the conventional zigzag scanning method of H.264/AVC.

The method of the present invention described above may be realized as a program and stored in a computer-readable recording medium such as a CD-ROM, RAM, ROM, floppy disks, hard disks, magneto-optical disks and so forth. Since the program can be easily implemented by those skilled in the art to which the present invention pertains, further description of the program will not be provided herein.

While the present invention has been described with respect to certain preferred embodiments, it will be apparent to those skilled in the art that various changes and modifications may be made without departing from the scope of the invention as defined in the following claims.

What is claimed is:

1. An encoding method, comprising:
performing transformation and quantization for a residual block to obtain transform coefficients; and
performing encoding for the transform coefficients scanned according to a scanning mode,
wherein the residual block is generated based on a prediction block,
wherein the scanning mode is selected based on an intra prediction mode used for intra prediction to generate the prediction block,
wherein the intra prediction uses a reference pixel adjacent to a current block to generate the prediction block,
wherein the reference pixel is determined according to the intra prediction mode of the intra prediction,
wherein a reconstructed block is generated based on the prediction block and a reconstructed residual block,
wherein the reconstructed residual block is generated based on the transform coefficients,
wherein a first scanning mode which is selected as the scanning mode when the intra prediction mode is a horizontal mode is different from a second scanning mode which is selected as the scanning mode when the intra prediction mode is a vertical mode,
wherein the horizontal mode is a first intra prediction mode which uses a first reconstructed pixel horizontally adjacent to a left side of the current block as the reference pixel to generate values of first predicted pixels of the prediction block,
wherein each of vertical coordinates of the first prediction pixels is equal to a vertical coordinate of the first reconstructed pixel,
wherein the vertical mode is a second intra prediction mode which uses a second reconstructed pixel vertically adjacent to an upper side of the current block as the reference pixel to generate values of second predicted pixels of the prediction block,
wherein each of horizontal coordinates of the second prediction pixels is equal to a horizontal coordinate of the second reconstructed pixel,
wherein the scanning mode is a horizontal scanning mode in a case that the intra prediction mode of the current block is the vertical mode,
wherein the scanning mode is a vertical scanning mode in a case that the intra prediction mode of the current block is the horizontal mode,
wherein all coefficients of each row of the transform coefficients are sequentially scanned in a case that the horizontal scanning mode is used as the scanning mode,
wherein all coefficients of each column of the transform coefficients are sequentially scanned in a case that the vertical scanning mode is used as the scanning mode,
wherein no coefficient of another row is scanned during sequential scanning of all coefficients of a row when the horizontal scanning mode is used as the scanning mode, and
wherein no coefficient of another column is scanned during sequential scanning of all coefficients of a column when the vertical scanning mode is used as the scanning mode.

2. The encoding method of claim 1, wherein scanning of the transform coefficients proceeds row-by-row starting with a first row of rows of the transform coefficient when the horizontal scanning mode is used as the scanning mode, and
wherein scanning of the transform coefficients proceeds column-by-column starting with a first column of columns of the transform coefficient when the vertical scanning mode is used as the scanning mode.

3. A decoding method, comprising:
performing decoding of encoded video information to obtain transform coefficients;
selecting a scanning mode for the transform coefficients; and
scanning the transform coefficients based on the scanning mode;
wherein the scanning mode is selected based on an intra prediction mode used for intra prediction,
wherein the intra prediction uses a reference pixel adjacent to a current block to generate a prediction block,
wherein the reference pixel is determined according to the intra prediction mode of the intra prediction,
wherein a reconstructed block is generated based on the prediction block and a reconstructed residual block,
wherein the reconstructed residual block is generated based on the transform coefficients,
wherein a first scanning mode which is selected as the scanning mode when the intra prediction mode is a horizontal mode is different from a second scanning mode which is selected as the scanning mode when the intra prediction mode is a vertical mode,
wherein the horizontal mode is a first intra prediction mode which uses a first reconstructed pixel horizontally adjacent to a left side of the current block as the reference pixel to generate values of first predicted pixels of the prediction block,
wherein each of vertical coordinates of the first prediction pixels is equal to a vertical coordinate of the first reconstructed pixel,
wherein the vertical mode is a second intra prediction mode which uses a second reconstructed pixel vertically adjacent to an upper side of the current block as the reference pixel to generate values of second predicted pixels of the prediction block,
wherein each of horizontal coordinates of the second prediction pixels is equal to a horizontal coordinate of the second reconstructed pixel,
wherein the scanning mode is a horizontal scanning mode in a case that the intra prediction mode of the current block is the vertical mode,
wherein the scanning mode is a vertical scanning mode in a case that the intra prediction mode of the current block is the horizontal mode,
wherein all coefficients of each row of the transform coefficients are sequentially scanned in a case that the horizontal scanning mode is used as the scanning mode, and
wherein all coefficients of each column of the transform coefficients are sequentially scanned in a case that the vertical scanning mode is used as the scanning mode,
wherein no coefficient of another row is scanned during sequential scanning of all coefficients of a row when the horizontal scanning mode is used as the scanning mode, and
wherein no coefficient of another column is scanned during sequential scanning of all coefficients of a column when the vertical scanning mode is used as the scanning mode.

4. The decoding method of claim 3, wherein scanning of the transform coefficients proceeds row-by-row starting with a first row of rows of the transform coefficient when the horizontal scanning mode is used as the scanning mode, and
wherein scanning of the transform coefficients proceeds column-by-column starting with a first column of columns of the transform coefficient when the vertical scanning mode is used as the scanning mode.

5. A method for sending a bitstream, the method comprising:
sending the bitstream comprising intra prediction mode information indicating an intra prediction mode, wherein
the intra prediction mode information is information used to perform decoding for a current block,
a scanning mode used to scan transform coefficients is selected based on the intra prediction mode used for intra prediction during the decoding,
the intra prediction uses a reference pixel adjacent to the current block to generate a prediction block during the decoding,
the reference pixel is determined according to the intra prediction mode of the intra prediction during the decoding,
a reconstructed block is generated based on the prediction block and a reconstructed residual block during the decoding,
the reconstructed residual block is generated based on the transform coefficients during the decoding,
a first scanning mode which is selected as the scanning mode when the intra prediction mode is a horizontal mode is different from a second scanning mode which is selected as the scanning mode when the intra prediction mode is a vertical mode during the decoding,
the horizontal mode is a first intra prediction mode which uses a first reconstructed pixel horizontally adjacent to a left side of the current block as the reference pixel to generate values of first predicted pixels of the prediction block,
each of vertical coordinates of the first prediction pixels is equal to a vertical coordinate of the first reconstructed pixel,
the vertical mode is a second intra prediction mode which uses a second reconstructed pixel vertically adjacent to an upper side of the current block as the reference pixel to generate values of second predicted pixels of the prediction block,
each of horizontal coordinates of the second prediction pixels is equal to a horizontal coordinate of the second reconstructed pixel,
the scanning mode is a horizontal scanning mode in a case that the intra prediction mode of the current block is the vertical mode,
the scanning mode is a vertical scanning mode in a case that the intra prediction mode of the current block is the horizontal mode,
all coefficients of each row of the transform coefficients are sequentially scanned in a case that the horizontal scanning mode is used as the scanning mode during the decoding, and
all coefficients of each column of the transform coefficients are sequentially scanned in a case that the vertical scanning mode is used as the scanning mode during the decoding,
wherein no coefficient of another row is scanned during sequential scanning of all coefficients of a row when the horizontal scanning mode is used as the scanning mode, and
wherein no coefficient of another column is scanned during sequential scanning of all coefficients of a column when the vertical scanning mode is used as the scanning mode.

6. The method of claim 5, wherein scanning of the transform coefficients proceeds row-by-row starting with a first row of rows of the transform coefficient when the horizontal scanning mode is used as the scanning mode, and wherein scanning of the transform coefficients proceeds column-by-column starting with a first column of columns of the transform coefficient when the vertical scanning mode is used as the scanning mode.

7. A non-transitory computer-readable recording medium storing program instructions for transmitting a bitstream, the program instructions comprising:

an instruction to perform generating the bitstream; and an instruction to transmit the bitstream, wherein the generating the bitstream comprises:

performing transformation and quantization for a residual block to obtain transform coefficients;

performing encoding for the transform coefficients scanned according to a scanning mode; and generating the bitstream comprising intra prediction mode information which indicates an intra prediction mode, wherein the residual block is generated based on a prediction block, wherein the scanning mode is selected based on the intra prediction mode used for intra prediction to generate the prediction block, wherein the intra prediction uses a reference pixel adjacent to a current block to generate the prediction block, wherein the reference pixel is determined according to the intra prediction mode of the intra prediction, wherein a reconstructed block is generated based on the prediction block and a reconstructed residual block, wherein the reconstructed residual block is generated based on the transform coefficients, wherein a first scanning mode which is selected as the scanning mode when the intra prediction mode is a horizontal mode is different from a second scanning mode which is selected as the scanning mode when the intra prediction mode is a vertical mode, wherein the horizontal mode is a first intra prediction mode which uses a first reconstructed pixel horizontally adjacent to a left side of the current block as the reference pixel to generate values of first predicted pixels of the prediction block, wherein each of vertical coordinates of the first prediction pixels is equal to a vertical coordinate of the first reconstructed pixel, wherein the vertical mode is a second intra prediction mode which uses a second reconstructed pixel vertically adjacent to an upper side of the current block as the reference pixel to generate values of second predicted pixels of the prediction block, wherein each of horizontal coordinates of the second prediction pixels is equal to a horizontal coordinate of the second reconstructed pixel, wherein the scanning mode is a horizontal scanning mode in a case that the intra prediction mode of the current block is the vertical mode, wherein the scanning mode is a vertical scanning mode in a case that the intra prediction mode of the current block is the horizontal mode, wherein all coefficients of each row of the transform coefficients are sequentially scanned in a case that the horizontal scanning mode is used as the scanning mode, wherein all coefficients of each column of the transform coefficients are sequentially scanned in a case that the vertical scanning mode is used as the scanning mode, wherein no coefficient of another row is scanned during sequential scanning of all coefficients of a row when the horizontal scanning mode is used as the scanning mode, and wherein no coefficient of another column is scanned during sequential scanning of all coefficients of a column when the vertical scanning mode is used as the scanning mode.

8. The non-transitory computer-readable storage medium of claim 7, wherein scanning of the transform coefficients proceeds row-by-row starting with a first row of rows of the transform coefficient when the horizontal scanning mode is used as the scanning mode, and wherein scanning of the transform coefficients proceeds column-by-column starting with a first column of columns of the transform coefficient when the vertical scanning mode is used as the scanning mode.

* * * * *